US012587986B2

(12) United States Patent
Kim et al.

(10) Patent No.:    US 12,587,986 B2
(45) Date of Patent:    Mar. 24, 2026

(54) METHOD AND DEVICE FOR DETERMINING DOWNLINK TRANSMISSION TIMING FOR RELAY NODE IN NEXT GENERATION COMMUNICATION SYSTEM

(71) Applicant: LG Electronics Inc., Seoul (KR)

(72) Inventors: Youngtae Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 18/511,305

(22) Filed: Nov. 16, 2023

(65) Prior Publication Data

US 2024/0089882 A1    Mar. 14, 2024

Related U.S. Application Data

(63) Continuation of application No. 17/292,932, filed as application No. PCT/KR2019/010181 on Aug. 12, 2019, now Pat. No. 11,864,138.

(60) Provisional application No. 62/758,691, filed on Nov. 11, 2018.

(51) Int. Cl.
*H04W 56/00*    (2009.01)

(52) U.S. Cl.
CPC .............................. *H04W 56/0015* (2013.01)

(58) Field of Classification Search
None
See application file for complete search history.

(56) References Cited

U.S. PATENT DOCUMENTS

| | | | | |
|---|---|---|---|---|
| 2020/0053682 A1* | 2/2020 | Abedini | ............ | H04W 56/0045 |
| 2021/0218620 A1* | 7/2021 | Yuan | ................ | H04W 56/0045 |
| 2021/0345279 A1* | 11/2021 | Ying | ................ | H04W 74/0833 |
| 2021/0385776 A1* | 12/2021 | Dahlman | .......... | H04W 56/0025 |
| 2023/0397143 A1* | 12/2023 | Miao | ................ | H04W 56/0045 |

* cited by examiner

*Primary Examiner* — Brian S Roberts
(74) *Attorney, Agent, or Firm* — Fish & Richardson P.C.

(57)    ABSTRACT

The present application discloses a method for transmitting a downlink signal by a child node in a next generation wireless communication system. Specifically, the method comprises the steps of: receiving information on a timing advanced value from a parent node; determining a reception timing of a first downlink signal transmitted from the parent node; calculating a transmission timing of a second downlink signal preceding the reception timing of the first downlink signal by a timing correction value based on a preconfigured offset value and the timing advanced value; and according to the transmission timing of the second downlink signal, transmitting the second downlink signal to another child node.

10 Claims, 15 Drawing Sheets

(A) CONTROL-PLANE PROTOCOL STACK (B) USER-PLANE PROTOCOL STACK

FIG. 2

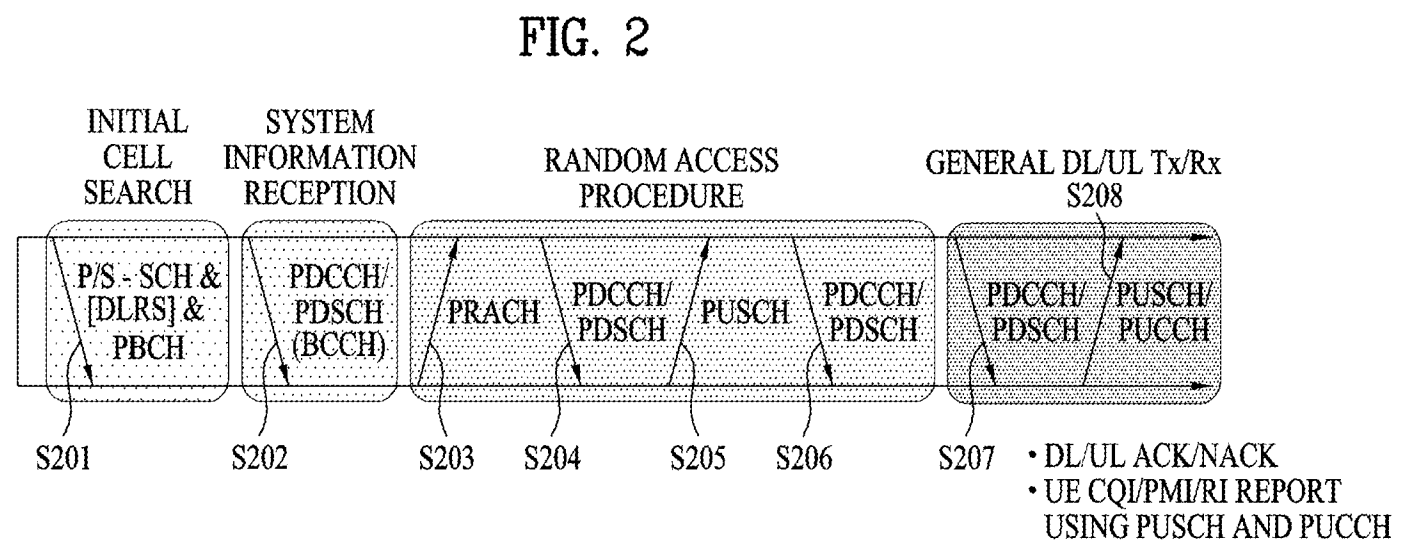

INITIAL CELL SEARCH

SYSTEM INFORMATION RECEPTION

RANDOM ACCESS PROCEDURE

GENERAL DL/UL Tx/Rx S208

P/S.-SCH & [DLRSJ & PBCH

S201

PDCCH/ PDSCH (BCCH)

S202

PRACH

S203

PDCCH/ PDSCH

S204

PUSCH

S205

PDCCH/ PDSCH

S206

PDCCH/ PDSCH

S207

PUSCH / PUCCH

• DL/UL ACK/NACK
• UE CQI/PMI/RI REPORT USING PUSCH AND PUCCH

Receive information about
timing advance value from parent node — S1101

Determine reception timing of first downlink
signal transmitted by parent node — S1103

Calculate transmission timing
of second downlink signal — S1105

Transmit second downlink signal — S1107

FIG. 15

METHOD AND DEVICE FOR DETERMINING DOWNLINK TRANSMISSION TIMING FOR RELAY NODE IN NEXT GENERATION COMMUNICATION SYSTEM

CROSS-REFERENCE TO RELATED APPLICATIONS

This application is a continuation of U.S. application Ser. No. 17/292,932, filed on May 11, 2021, which is a National Stage application under 35 U.S.C. § 371 of International Application No. PCT/KR2019/010181, filed on Aug. 12, 2019, which claims the benefit of U.S. Provisional Application No. 62/758,691, filed on Nov. 11, 2018. The disclosures of the prior applications are incorporated by reference in their entirety.

TECHNICAL FIELD

The present disclosure relates to a wireless communication system and, more particularly, to a method of determining a downlink transmission timing for a relay node in a next-generation communication system, and an apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

Based on the above-described discussion, a method of determining a downlink transmission timing for a relay node in a next-generation communication system, and an apparatus therefor will be proposed hereinbelow.

According to an aspect of the present disclosure, provided herein is a method of transmitting a downlink signal by a child node in a next-generation wireless communication system, including receiving information about a timing advance value from a parent node; determining a reception timing of a first downlink signal transmitted by the parent node; calculating a transmission timing of a second downlink signal by advancing the transmission timing of the second downlink signal by a timing correction value, based on the timing advance value and a preset offset value, from the reception timing of the first downlink signal; and transmitting the second downlink signal to another child node according to the transmission timing of the second downlink signal.

In another aspect of the present disclosure, provided herein is a relay node in a next-generation wireless communication system, including a wireless communication module; at least one processor; and at least one memory connected operably to the at least one processor and configured to store instructions for causing the at least one processor to perform a specific operation based on execution of the instructions, wherein the specific operation includes receiving information about a timing advance value from a parent node, determining a reception timing of a first downlink signal transmitted by the parent node, calculating a transmission timing of a second downlink signal by advancing the transmission timing of the second downlink signal by a timing correction value, based on the timing advance value and a preset offset value, from the reception timing of the first downlink signal, and transmitting the second downlink signal to another child node according to the transmission timing of the second downlink signal.

the transmission timing of the first downlink signal and the transmission timing of the second downlink signal may be identical.

The preset offset value may be included in a random access response message received from the parent node or may be provided by higher layer signaling. The timing advance value may be a most recently updated timing advance value from reception of the preset offset value.

The timing correction value may be a sum of a half of the timing advance value and the preset offset value.

According to an embodiment of the present disclosure, a relay node in a next-generation communication system may more efficiently determine a downlink transmission timing.

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF THE DRAWINGS

FIG. 2 is a diagram illustrating physical channels and a general signal transmission method using the physical channels in a 3GPP system.

FIGS. 13 to 15 are diagrams illustrating an artificial intelligence (AI) system and device for implementing embodiments of the present disclosure.

DETAILED DESCRIPTION

Figure 1:
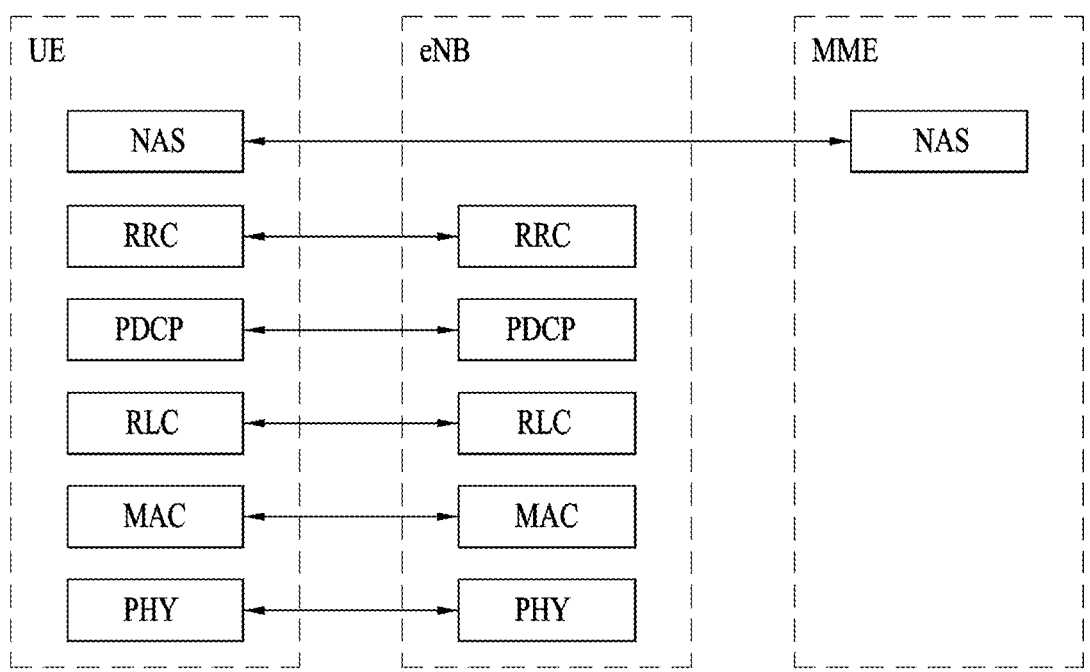
FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
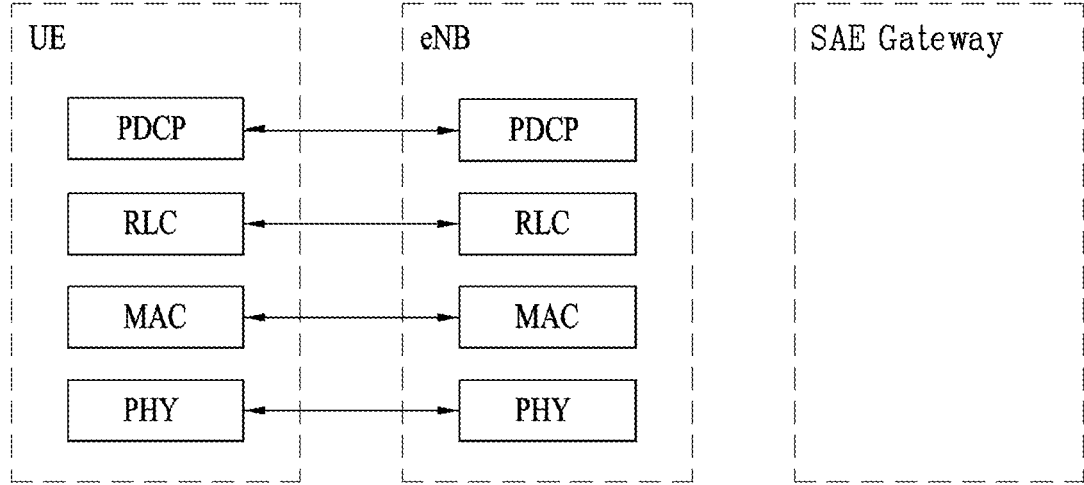

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

<Artificial Intelligence (AI)>

AI refers to the field of studying AI or methodology for making the same, and machine learning refers to the field of defining various issues dealt with in the AI field and studying methodology for solving the various issues. The machine learning is defined as an algorithm that enhances the performance of a certain task through consistent experiences with the task.

An artificial neural network (ANN) is a model used in the machine learning and may mean a whole model of problem-solving ability which is composed of artificial neurons (nodes) that form a network by synaptic connections. The ANN may be defined by a connection pattern between neurons in different layers, a learning process for updating model parameters, and an activation function for generating an output value.

The ANN may include an input layer, an output layer, and optionally one or more hidden layers. Each layer includes one or more neurons, and the ANN may include a synapse that links neurons. In the ANN, each neuron may output the function value of the activation function for input signals, weights, and bias input through the synapse.

The model parameter refers to a parameter determined through learning and includes the weight value of a synaptic connection and the bias of a neuron. A hyperparameter means a parameter to be set in the machine learning algorithm before learning and includes a learning rate, a repetition number, a mini-batch size, and an initialization function.

The purpose of the learning of the ANN may be to determine the model parameter that minimizes a loss function. The loss function may be used as an index to determine the optimal model parameter in the learning process of the ANN.

Machine learning may be classified into supervised learning, unsupervised learning, and reinforcement learning according to learning mechanisms.

The supervised learning may refer to a method of training the ANN in a state that labels for learning data are given, and the label may mean a correct answer (or result value) that the ANN must infer when the learning data is input to the ANN.

The unsupervised learning may refer to a method of training the ANN in a state that labels for learning data are not given. The reinforcement learning may refer to a method of learning an agent defined in a certain environment to select a behavior or a behavior sequence that maximizes cumulative compensation in each state.

Machine learning implemented with a deep neural network (DNN) including a plurality of hidden layers among ANNs is referred to as deep learning. The deep running is part of the machine running. The machine learning used herein includes the deep running.

<Robot>

A robot may refer to a machine that automatically processes or operates a given task based on its own ability. In particular, a robot having a function of recognizing an environment and making a self-determination may be referred to as an intelligent robot.

Robots may be classified into industrial robots, medical robots, home robots, military robots, etc. according to use purposes or fields.

The robot may include a driving unit having an actuator or a motor and perform various physical operations such as moving a robot joint. In addition, a movable robot may include a driving unit having a wheel, a brake, a propeller, etc. and may travel on the ground or fly in the air through the driving unit.

<Autonomous Driving (Self-Driving)>

Autonomous driving refers to a technique of driving by itself. An autonomous driving vehicle refers to a vehicle moving with no user manipulation or with minimum user manipulation.

For example, the autonomous driving may include a technology for maintaining a current lane, a technology for automatically adjusting a speed such as adaptive cruise control, a technique for automatically moving along a predetermined route, and a technology for automatically setting a route and traveling along the route when a destination is determined.

The vehicle may include a vehicle having only an internal combustion engine, a hybrid vehicle having an internal combustion engine and an electric motor together, and an electric vehicle having only an electric motor. Further, the vehicle may include not only an automobile but also a train, a motorcycle, etc.

The autonomous driving vehicle may be regarded as a robot having the autonomous driving function.

<Extended Reality (XR)>

Extended reality is collectively referred to as virtual reality (VR), augmented reality (AR), and mixed reality (MR). The VR technology provides real-world objects and backgrounds as CG images, the AR technology provides virtual CG images on real object images, and the MR technology is a computer graphic technology of mixing and combining virtual objects with the real world.

The MR technology is similar to the AR technology in that real and virtual objects are shown together. However, the MR technology is different from the AR technology in that the AR technology uses virtual objects to complement real objects, whereas the MR technology deal with virtual and real objects in the same way.

The XR technology may be applied to a HMD, a head-up display (HUD), a mobile phone, a tablet PC, a laptop computer, a desktop computer, a TV, a digital signage, etc. A device to which the XR technology is applied may be referred to as an XR device.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

5G communication involving a new radio access technology (NR) system will be described below.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RS s according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
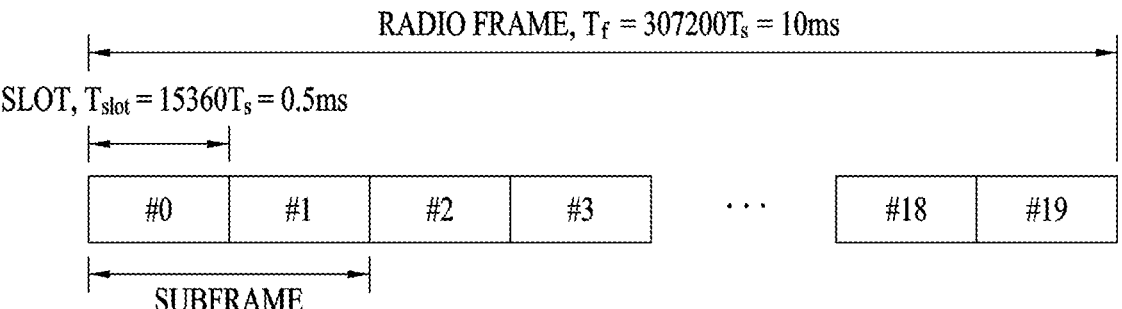
FIG. 3 illustrates a structure of a radio frame in a Long Term Evolution (LTE) system.

FIG. 3 illustrates a structure of a radio frame used in the LTE system.

Referring to FIG. 3, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s = 1/(15 \text{ kHz} \times 2048) = 3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 4:
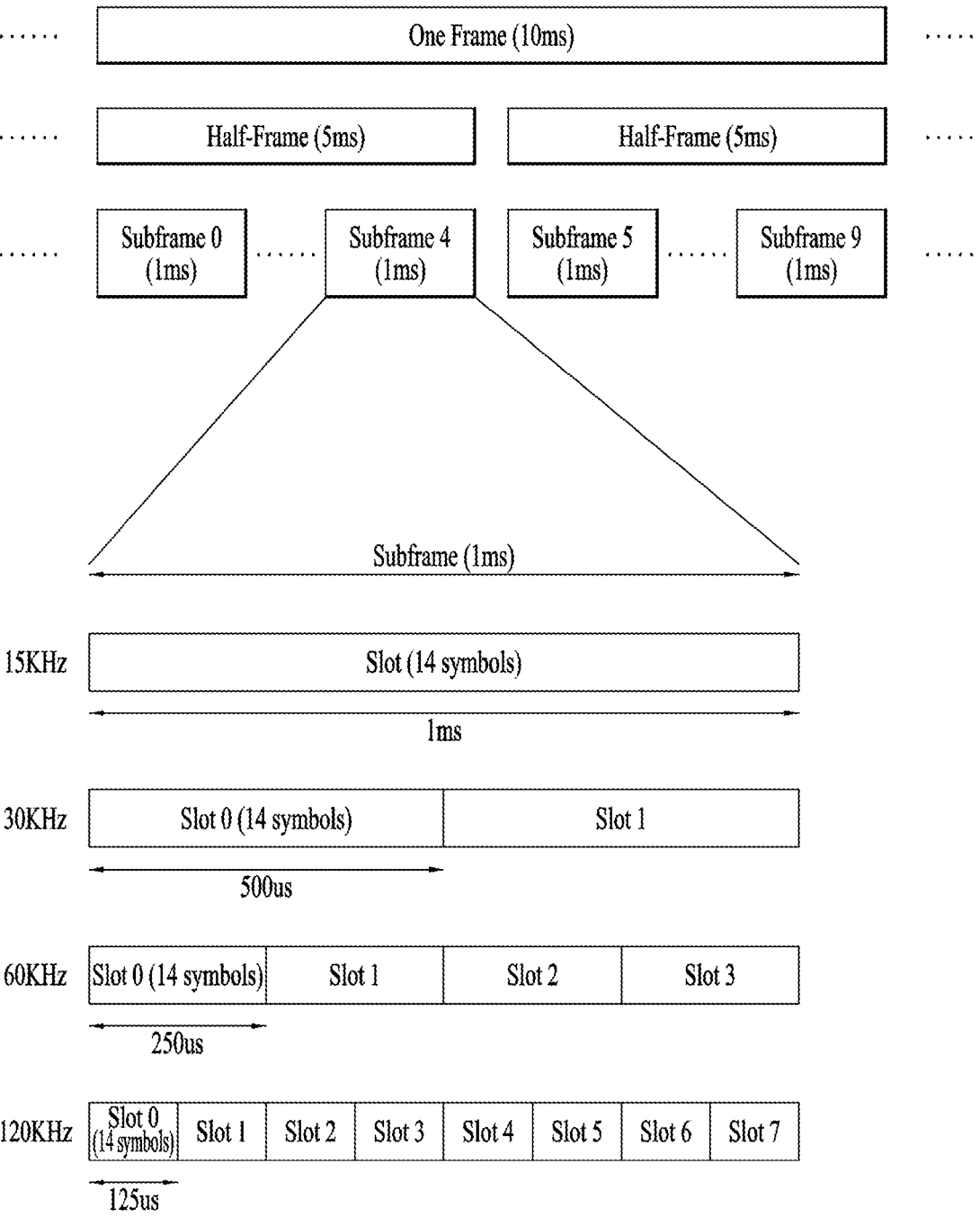
FIGS. 4, 5 and 6 are diagrams illustrating structures of a radio frame and slots used in a new RAT (NR) system.

FIG. 4 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 5:
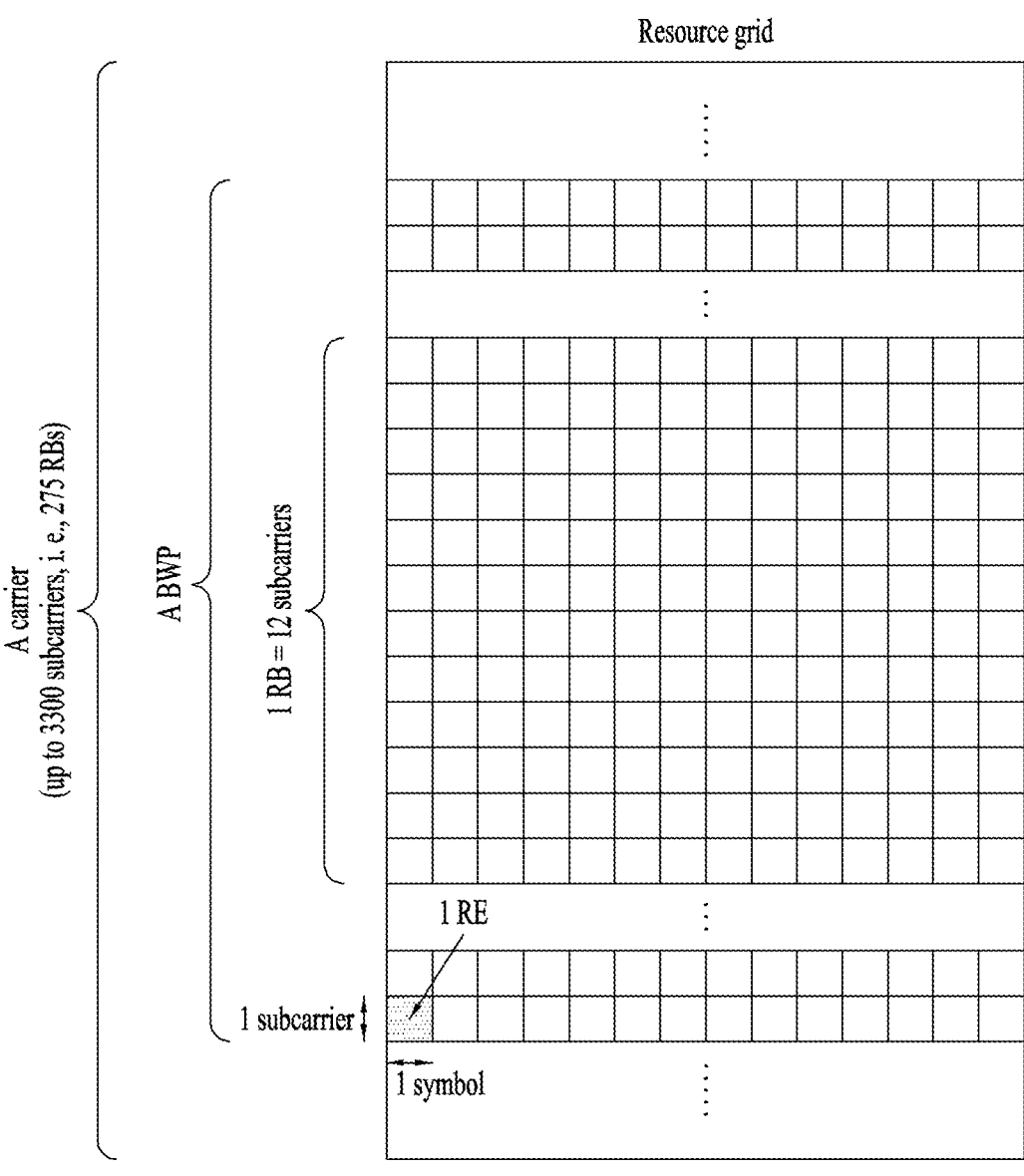

FIG. 5 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 6:
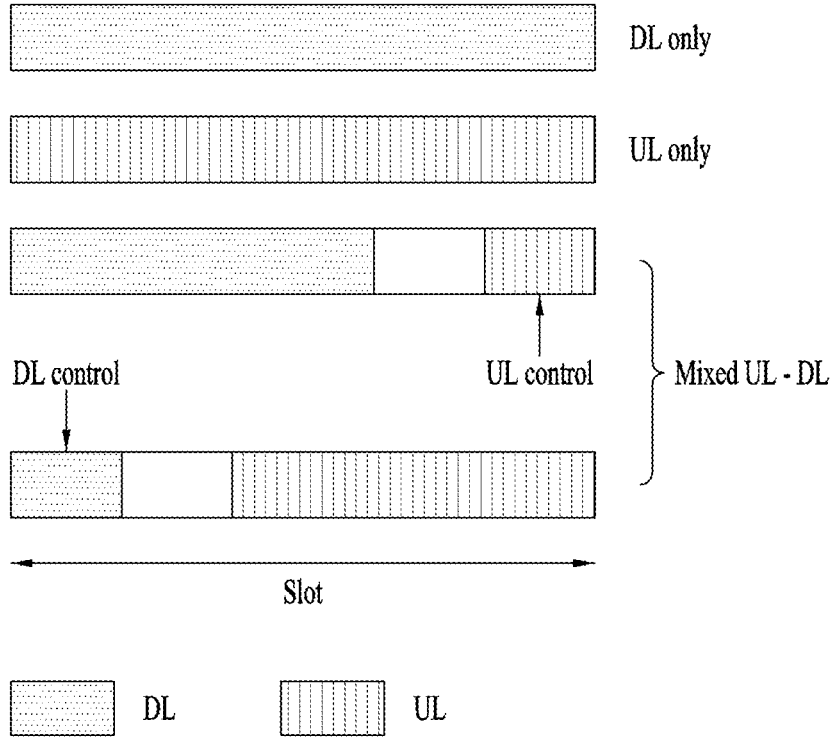

FIG. 6 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
    DL region+Guard period (GP)+UL control region
    DL control region+GP+UL region
    DL region: (i) DL data region, (ii) DL control region+ DL data region
    UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

In an NR system, a technique of using an ultra-high frequency band, that is, a millimeter frequency band at or above 6 GHz is considered in order to transmit data to a plurality of users at a high transmission rate in a wide frequency band. In 3GPP, this technique is called NR and will be referred to as an NR system in the present disclosure. However, the millimeter frequency band has the frequency property that a signal is attenuated too rapidly according to distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for rapid propagation attenuation and thus overcome decrease of coverage caused by the rapid propagation attenuation. However, if a service is provided by using only one narrow beam, the service coverage of one gNB becomes narrow, and thus the gNB provides a service in a wide band by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 cm by 5 cm panel. Therefore, it is considered to increase coverage or throughput by increasing beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using time delay (i.e., a cyclic shift), and hybrid beamforming using both digital beamforming and analog beamforming. If a transceiver unit (TXRU) is provided to enable control of transmission power and a phase per antenna element, independent beamforming per frequency resource is possible. However, installation of TXRUs for all of about 100 antenna elements is not feasible in terms of cost. That is, to compensate for rapid propagation attenuation in the millimeter frequency band, multiple antennas should be used, and digital beamforming requires as many radio frequency (RF) components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case in which a large number of antennas is required as in the millimeter frequency band, analog beamforming or hybrid beamforming is considered. In analog beamforming, a plurality of antenna elements is mapped to one TXRU, and the direction of a beam is controlled by an analog phase shifter. A shortcoming of this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time are limited to B or below although the number of beam directions is different according to connections between B TXRUs and Q antenna elements.

Digital BF performs signal processing on a digital baseband signal that is to be transmitted or is received as mentioned above, and therefore digital BF may transmit or receive signals in multiple directions at the same time using multiple beams. In contrast, analog BF performs beamforming with a received analog signal or an analog signal to be transmitted in a modulated state, and therefore analog BF may not simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. An RACH resource allocation scheme and a scheme of resource utilization in the gNB according to the present disclosure to be described later are proposed in consideration of constraints resulting from the characteristics of analog BF or hybrid BF.

Figure 7:
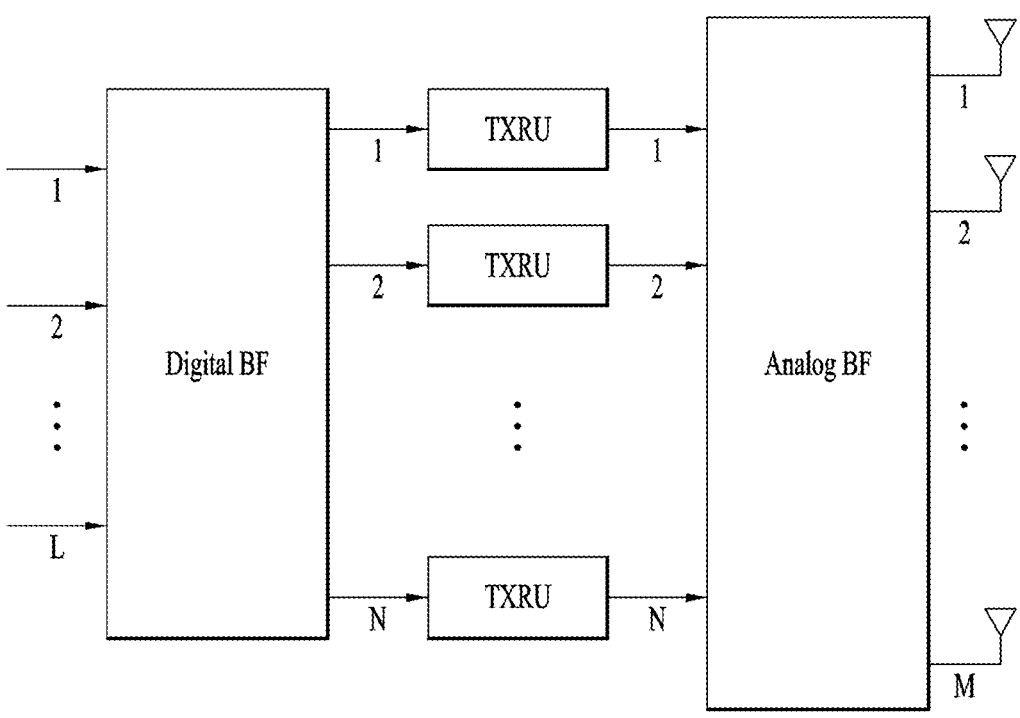
FIG. 7 abstractly illustrates a hybrid beamforming structure in terms of TXRUs and physical antennas.

FIG. 7 abstractly illustrates a hybrid beamforming structure in terms of TXRUs and physical antennas.

For the case in which multiple antennas are used, hybrid BF with digital BF and analog BF in combination has emerged. Analog BF (or RF BF) is an operation of performing precoding (or combining) in a transceiver (RF unit). Due to precoding (combining) in each of a baseband unit and a transceiver (or an RF unit), hybrid BF offers the benefit of performance close to the performance of digital BF, while reducing the number of RF chains and the number of DACs (or analog to digital converters (ADCs). For convenience, a hybrid BF structure may be represented by N TXRUs and M physical antennas. Digital BF for L data layers to be transmitted by a transmission end may be represented as an N-by-L matrix, and then N converted digital signals are converted into analog signals through TXRUs and subjected to analog BF represented as an M-by-N matrix.

In FIG. 7, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case in which a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 8:
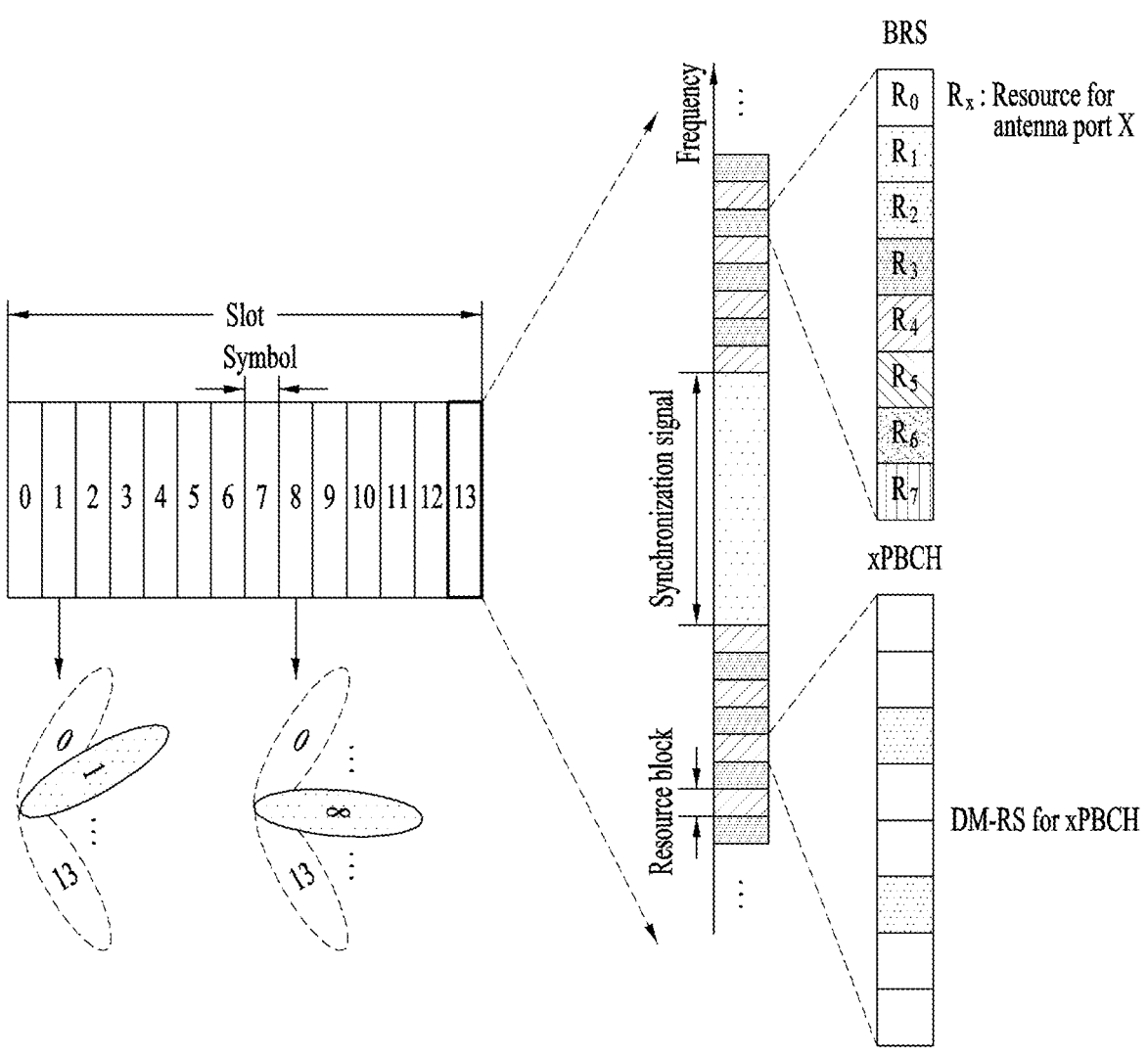
FIG. 8 illustrates a beam sweeping operation for an SS and system information during DL transmission.

FIG. 8 illustrates a beam sweeping operation for an SS and system information during DL transmission.

In FIG. 8, physical resources or a physical channel which broadcasts system information of the NR system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 8 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 9:
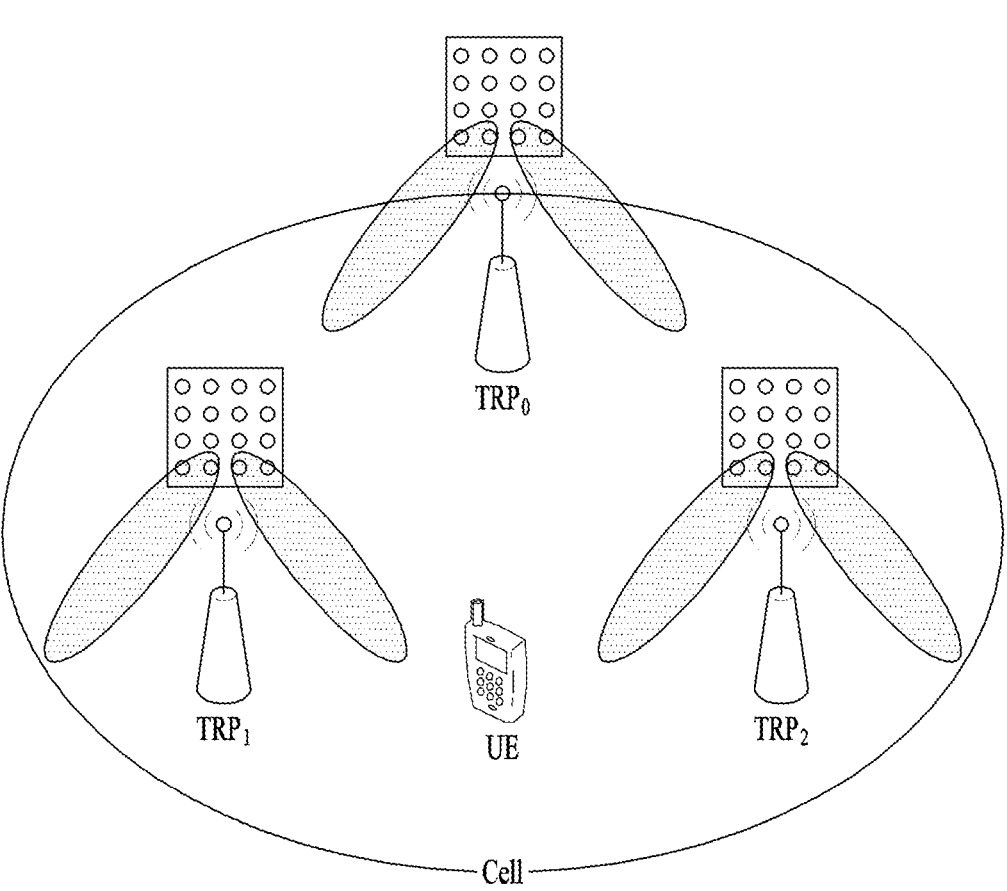
FIG. 9 illustrates a cell in a new radio access technology (NR) system.

FIG. 9 illustrates a cell in an NR system.

Referring to FIG. 9, compared to a wireless communication system such as legacy LTE in which one eNB forms one cell, configuration of one cell by a plurality of transmission/reception points (TRPs) is under discussion in the NR system. If a plurality of TRPs forms one cell, even though a TRP serving a UE is changed, seamless communication is advantageously possible, thereby facilitating mobility management for UEs.

Compared to the LTE/LTE-A system in which a PSS/SSS is transmitted omnidirectionally, a method of transmitting a signal such as a PSS/SSS/PBCH through BF performed by sequentially switching a beam direction to all directions at a gNB applying mmWave is considered. Signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Alternatively, if the gNB is capable of forming N beams, some beams may be grouped into one beam group, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Currently, in 3GPP Release 16, i.e., standardization of an NR system, a relay gNB is under discussion for the purpose of reducing wired connection between gNBs while compensating for a coverage hole. This is implemented through integrated access and backhaul (IAB). A donor gNB (DgNB) transmits a signal to a UE via a relay gNB. IAB includes a wireless backhaul link for communication between a DgNB and a relay gNB or between relay gNBs and an access link for communication between a DgNB and a UE or between a relay gNB and a UE.

Signal transmission through IAB is broadly categorized into two scenarios. The first one is an in-band scenario in which a wireless backhaul link and an access link use the same frequency band, and the second one is an out-band scenario in which the wireless backhaul link and the access link use different frequency bands. The first scenario should also deal with interference between the wireless backhaul link and the access link compared to the second scenario, so that the first scenario may be lower than the second scenario in terms of feasibility of implementation.

In the current standardization of the NR system, it is assumed that nodes transmit an SSB or a CSI-RS on the backhaul link in order to perform a discovery procedure. IAB nodes measure or discover the SSB or the CSI-RS to feed back the SSB or the CSI-RS to a parent node or a donor node, and a network or middle nodes determine route selection based on the feedback result. When root selection is determined by the middle nodes, the parent node may relay the discovered or measured feedback result to the middle nodes. When the network is responsible for root selection for nodes that the network manages, the parent node relays the discovered or measured feedback result to the donor node.

This discovery operation is based on the assumption that IAB nodes operate in a half-duplex scheme which does not allow simultaneous transmission and reception for the IAB nodes. Accordingly, there is a problem in that, while an IAB node transmits an SSB or a CSI-RS for the discovery operation, the IAB node is incapable of measuring or discovering SSBs or CSI-RSs that other nodes transmit. To solve this problem, it is necessary to perform TDM on SSBs or CSI-RSs transmitted between nodes. To this end, a transmission pattern for transmission of the SSBs or the CSI-RS s or a muting pattern for discontinuing ongoing transmission and discovering or measuring discovery signals from other nodes may be needed.

Hereinbelow, for convenience of description, when RN1 and RN2 connected via a backhaul link are present and RN1 relays transmitted and received data to RN2, RN1 will be referred to as a parent node of RN2, and RN2 will be referred to as a child node RN of RN1.

A discovery signal described in the present disclosure refers to a signal transmitted by an IAB node and is transmitted to enable other IAB nodes or UEs to find or discover the IAB node. The discovery signal may have a type of SSB, a type of CSI-RS, or a type of signal introduced in legacy NR. While the present disclosure mainly describes the case in which an IAB node discovers other IAB nodes, the present disclosure may also be applied to the case in which the UE discovers IAB nodes.

In order for IAB nodes to set DL transmission timings thereof in an IAB scenario, the present disclosure assumes that a parent node controls the DL transmission timings. Upon controlling a DL transmission timing of a child node of the parent node, the parent node may use a timing advance (TA) assumed when the child node transmits a UL signal to the parent node and the TA is a value for UL transmission.

However, when the TA value is updated, there is a problem in that a DL transmission timing is also updated. The present disclosure proposes a method for solving this problem.

Currently, in NR standardization, a DL transmission timing for each IAB node is determined by advancing the DL transmission timing by a propagation delay (PD) from a parent node of the IAB node to the IAB node from a DL reception timing from the parent node. That is, for network synchronization, IAB nodes perform DL transmission at the same timing, thereby reducing interference between IAB nodes or between UEs.

To calculate a PD from a parent node to an IAB node, the IAB node may use a TA value received from the parent node. Usually, the TA value is twice the PD and is used when calculating a UL transmission timing to the parent node. The IAB node performs UL transmission by advancing the transmission timing by the TA from the DL reception timing, thereby compensating for both a PD during UL transmission from the IAB node to the parent node and a PD during DL reception.

Most simply, if the DL transmission timing is calculated by advancing the DL transmission timing by TA/2 from the DL reception timing, the IAB node may perform DL transmission at the same timing as the parent node. However, for convenience, the TA value may be set to a value slightly different from a double value of an actual PD.

Figure 10:
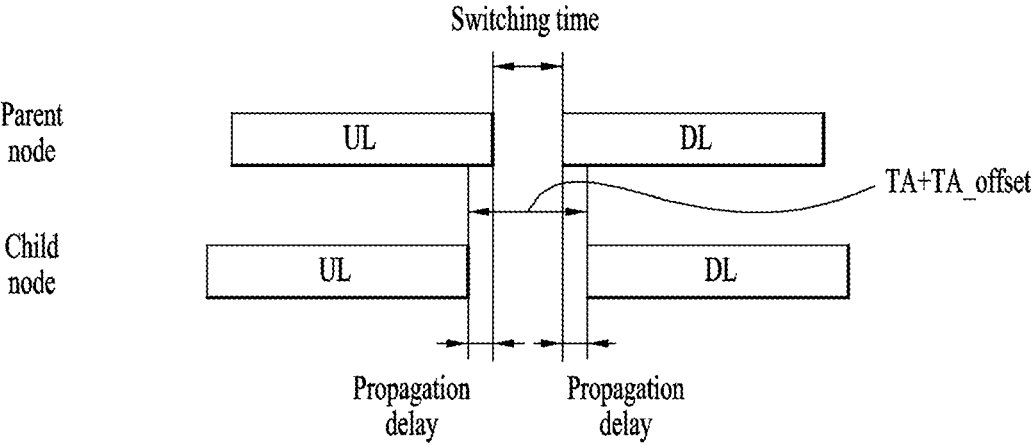
FIG. 10 is a diagram illustrating a method of determining a DL transmission timing of an IAB node.

FIG. 10 is a diagram illustrating a method of determining a DL transmission timing of an IAB node.

Referring to FIG. 10, a child node generally determines a UL transmission timing thereof by advancing the UL transmission timing by a value obtained by adding a TA offset value set for each band to a TA value received from a parent node from a reception timing of a DL signal of a parent node.

In this case, the parent node may calculate the TA value by doubling a PD value between the parent node and the child node on the assumption that the TA offset value set for each band is a switching time. However, the parent node may calculate the TA value as a value other than twice the PD, on the assumption that the switching time is different from the TA offset value, and inform the child node of the calculated TA value. In this case, the difference value, i.e., switching time-TA offset value, may be added to 2*PD and the resultant value may be determined as the TA value.

Accordingly, the parent node should inform the child node of a correction term in addition to the TA value in order to control the DL transmission timing. Two methods may be considered for the DL transmission timing.

1. For correction of the DL transmission timing, the parent node sets an X value for the child node.

(a) First, when the child node calculates the DL transmission timing, the DL transmission timing is advanced by X from the DL reception timing. That is, the parent node informs the child node of X at a time regardless of setting of a TA so that the child node sets the DL transmission timing. This method is advantageous in that the DL transmission timing is not changed since there is no relation to the TA even if the TA is changed. However, the range of the X value increases by the amount of the TA. The X value may be indicated by a random access response (RAR) or by RRC signaling.

In this case, the child node applies the DL transmission timing by advancing the DL transmission timing by X from the DL reception timing of the parent node.

(b) Alternatively, when the child node calculates the DL transmission timing, the DL transmission timing is advanced by TA/2+X from the DL reception timing. That is, the parent node informs the child node of only a correction term between a TA offset and a switching time as X based on setting of the TA, so that the child node sets the DL transmission timing by adding the correction term to TA/2. This method is advantageous in that the range of X decreases because only the correction term is set to X based on TA/2. However, since the DL transmission timing is dependent on the TA value, the DL transmission timing is also updated each time the TA value is updated, so that the DL transmission timing may be continuously changed. The X value may be indicated by RRC signaling or a MAC control element (CE).

In this case, the child node applies the DL transmission timing by advancing the DL transmission timing by TA/2+X from the DL reception timing of the parent node.

When the child node calculates the DL transmission timing described in (b) of Method 1, the method of advancing the DL transmission timing by TA/2+X from the DL reception timing has a disadvantage in that the DL transmission timing is continuously changed whenever the TA is updated. This means that the timing value is continuously changed when DL transmission to a UE supported by the child node or to a lower child node of the child node is performed. To solve such a problem, the following method may be used.

When the child node a configuration is configured with a DL transmission timing value received from the parent node, it is assumed that the DL transmission timing value is not affected by a TA value updated under the following conditions.

(i) The DL transmission timing is always not affected. That is, it may be assumed that only an initial TA value indicated by an RAR received during contention-based RACH transmission is applied to the DL transmission timing. In addition, when updating the DL transmission timing, it may be assumed that only a correction value based on a previous DL transmission timing value is indicated and other values are not applied to the DL transmission timing even when the TA value is changed.

(ii) When the TA value is changed by the RAR or RRC signaling, it is indicated whether or not the TA value is applied to the DL transmission timing.

(iii) The X value indicating that the DL transmission timing is changed is indicated by the RAR or RRC signaling (or MAC CE) so that a current TA value is applied only when a command to change the DL transmission timing is received. In this case, the current TA value means the most recently updated TA value.

(iv) When the DL transmission timing is changed by the RAR or RRC signaling, a TA value is applied to the DL transmission timing based on a TA value used when a previous transmission timing is set.

(v) Whether or not to use the TA value updated when the DL transmission timing is changed may be indicated through the RAR or RRC signaling. If the updated TA value is not used, it may be assumed that a TA value is applied to the DL transmission timing based on the TA value used when the previous DL transmission timing is set.

Figure 11:
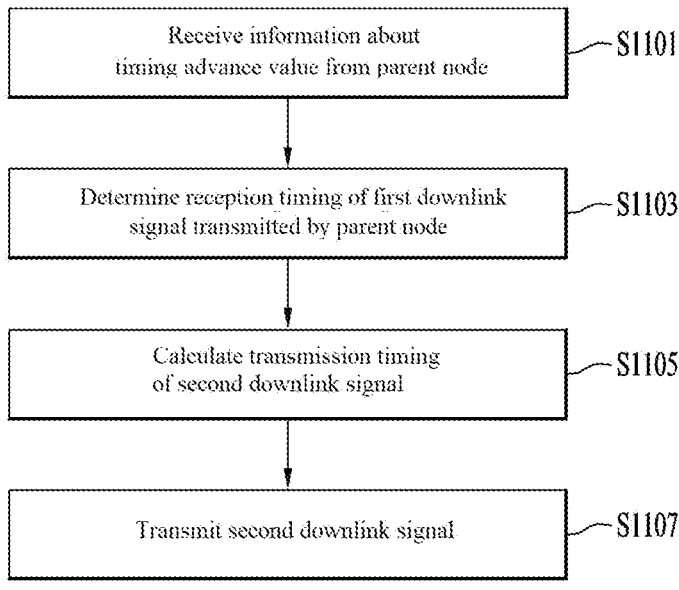
FIG. 11 is a flowchart of a method for performing DL transmission according to an embodiment of the present disclosure.

FIG. 11 is a flowchart of a method for performing DL transmission according to an embodiment of the present disclosure.

Referring to FIG. 11, a child node receives information about a TA value from a parent node in step 1101. Thereafter, the child node determines a reception timing of a first DL signal transmitted by the parent node in step 1103.

Next, in step 1105, the child node calculates a transmission timing of a second DL signal by advancing the transmission timing of the second DL signal by a timing correction value, based on the TA value and a preset offset value, from the reception timing of the first DL signal. The timing correction value means a sum of a half of the TA value and the preset offset value. This serves to set the transmission timing of the first DL signal and the transmission timing of the second DL signal to be the same.

Finally, in step 1107, the child node transmits the second DL signal to another child node according to the transmission timing of the second DL signal.

Desirably, the preset offset value in step 1105 may be included in an RAR message received from the parent node or provided by higher layer signaling. In this case, the TA value may be a most recently updated TA value from reception of the preset offset value.

Figure 12:
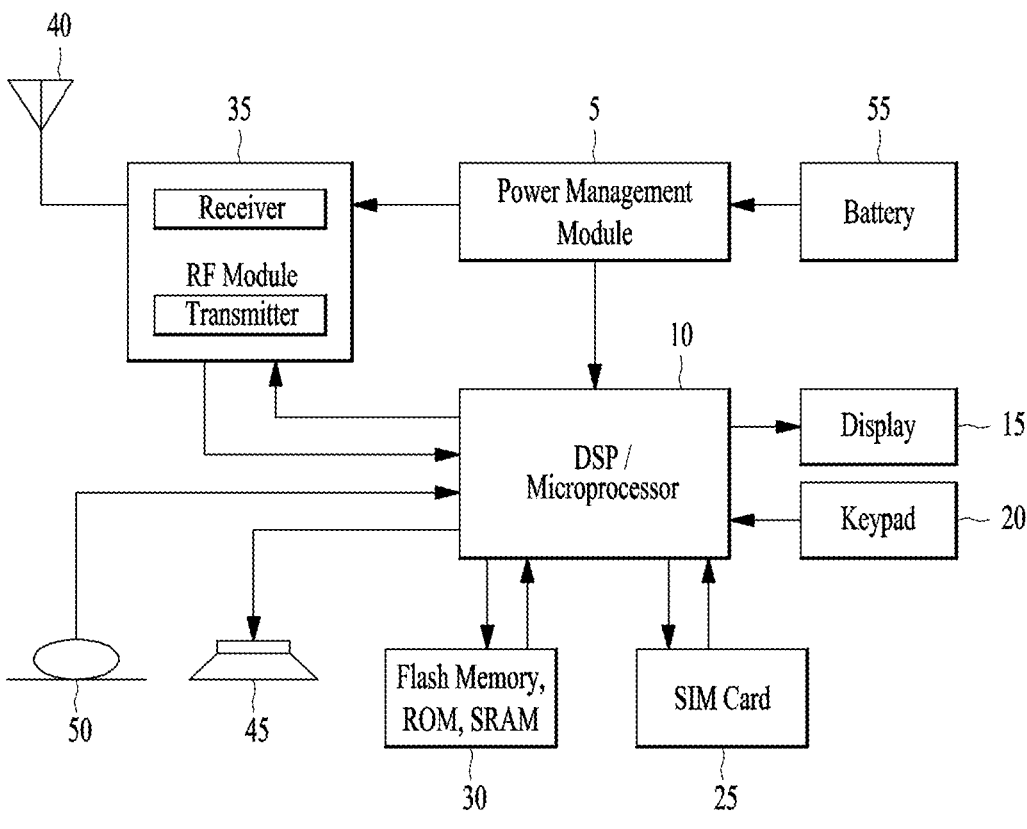
FIG. 12 is a block diagram illustrating elements of a device for implementing embodiments of the present disclosure.

FIG. 12 illustrates an example of a wireless communication device according to an embodiment of the present disclosure.

The wireless communication device illustrated in FIG. 12 may represent a UE and/or a BS according to an embodiment of the present disclosure. However, the wireless communication device of FIG. 12 may be replaced with any of various types of devices such as a vehicle communication system or device, a wearable device, and a laptop, not limited to the UE and/or the BS according to the embodiment of the present disclosure. More specifically, the above device may be a BS, a network node, a Tx UE, an Rx UE, a wireless device, a wireless communication device, a vehicle, a vehicle having a self-driving function, an unmanned aerial vehicle (UAV), an artificial intelligence (AI) module, a robot, an augmented reality (AR) device, a virtual reality (VR) device, a machine-type communication (MTC) device, an Internet of things (IoT) device, a medical device, a FinTech device (or a financial device), a security device, a weather/environment device, or a device related to the fourth industrial revolution or a 5G service. The UAV may be, for example, an aircraft without a human being onboard, which aviates by a wireless control signal. The MTC device and the IoT device may be, for example, devices that do not require direct human intervention or manipulation and may include smartmeters, vending machines, thermometers, smartbulbs, door locks, or various sensors. The medical device may be, for example, a device used for the purpose of diagnosing, treating, relieving, curing, or preventing disease or a device used for the purpose of inspecting, replacing, or modifying a structure or a function and may include a device for treatment, a device for operation, a device for (in vitro) diagnosis, a hearing aid, or an operation device. The security device may be, for example, a device installed to prevent a danger that may arise and to maintain safety and may include a camera, a CCTV, or a black box. The FinTech device may be, for example, a device capable of providing a financial service such as mobile payment and may include a payment device or a point of sale (POS) system. The weather/environment device may be, for example, a device for monitoring or predicting a weather/environment.

The Tx UE or the Rx UE may include, for example, a cellular phone, a smartphone, a laptop computer, a digital broadcast terminal, a personal digital assistant (PDA), a portable multimedia player (PMP), a navigation system, a slate PC, a tablet PC, an ultrabook, a wearable device (e.g., a smartwatch, smartglasses, or a head mounted display (HMD)), or a foldable device. The HMD may be, for example, a type of display device that is worn on the head and may be used to implement VR or AR.

In the example of FIG. 12, the UE and/or the BS according to the embodiment of the present disclosure includes at least one processor 10 such as a digital signal processor or a microprocessor, a transceiver 35, a power management module 5, an antenna 40, a battery 55, a display 15, a keypad 20, a memory 30, a subscriber identity module (SIM) card 25, a speaker 45, and a microphone 50. In addition, the UE and/or the BS may include one or more antennas. The transceiver 35 may be also referred to as an RF module.

The at least one processor 10 may be configured to implement the functions, procedures and/or methods. In at least some of the embodiments, the at least one processor 10 may implement one or more protocols, such as layers of radio interface protocols (e.g., functional layers).

The memory 30 is coupled to the at least one processor 10 and stores information related to the operations of the at least one processor 10. The memory 30 may be located inside or outside the at least one processor 10 and may be coupled to the at least one processor 10 by various techniques such as wired or wireless communication.

A user may input various types of information (e.g., indication information such as a telephone number) by various techniques such as pressing a button on the keypad 20 or activating voice using the microphone 50. The at least one processor 10 executes appropriate functions such as receiving and/or processing information of the user and dialing a telephone number.

It is also possible to retrieve data (e.g., operational data) from the SIM card 25 or the memory 30 to execute the appropriate functions. In addition, the at least one processor 10 may receive and process global positioning system (GPS) information from a GPS chip to obtain location information about the UE and/or the BS such as in vehicle navigation, map service, or the like, or execute functions related to the location information. Further, the at least one processor 10 may display these various types of information and data on the display 15 for reference and user convenience.

The transceiver 35 is coupled to the at least one processor 10 to transmit and/or receive wireless signals such as RF signals. The at least one processor 10 may control the transceiver 35 to initiate communication and transmit wireless signals including various types of information or data, such as voice communication data. The transceiver 35 may include a receiver for receiving a wireless signal and a transmitter for transmitting a wireless signal. The antenna 40 facilitates the transmission and reception of wireless signals. In some embodiments, upon receipt of a wireless signal, the transceiver 35 may forward and convert the signal to a baseband frequency for processing by the at least one processor 10. The processed signal may be processed according to various techniques, such as being converted into audible or readable information, and output through the speaker 45.

In some embodiments, a sensor may also be coupled to the at least one processor 10. The sensor may include one or more sensing devices configured to detect various types of information, including velocity, acceleration, light, vibration, and the like. The at least one processor 10 receives and processes sensor information obtained from the sensor, such as proximity, position, image, and the like, thereby executing various functions such as collision avoidance and autonomous driving.

Various components such as a camera and a universal serial bus (USB) port may further be included in the UE and/or the BS. For example, a camera may further be coupled to the at least one processor 10, for use in various services including autonomous driving and vehicle safety services.

FIG. 12 merely illustrates one example of devices included in a UE and/or a BS, not limiting the present disclosure. For example, some components, such as the keypad 20, the GPS chip, the sensor, the speaker 45 and/or the microphone 50 may be excluded from UE and/or BS implementation in some embodiments.

Figure 13:
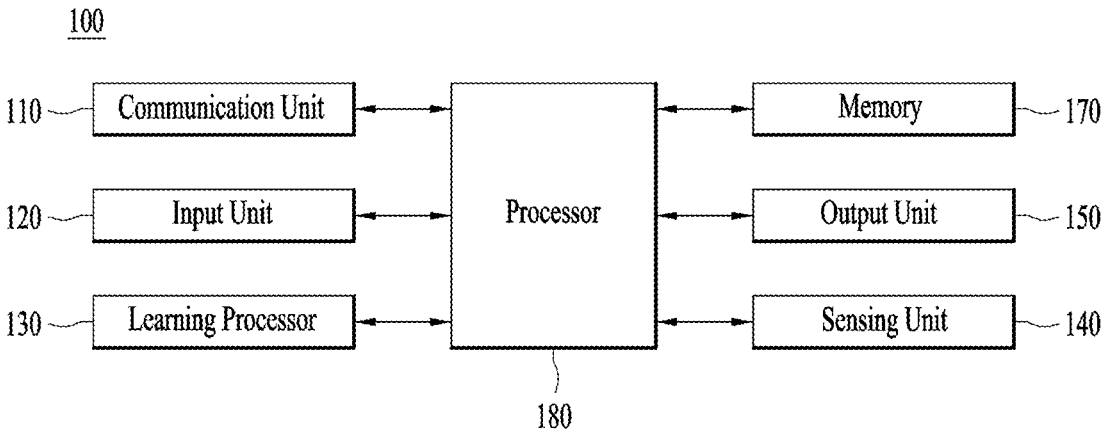

FIG. 13 illustrates an AI device 100 according to an embodiment of the present disclosure.

The AI device 100 may be implemented by a stationary or mobile device, for example, a TV, a projector, a mobile phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a desktop computer, a digital signage, a robot, a vehicle, etc.

Referring to FIG. 13, the AI device 100 may include a communication unit 110, an input unit 120, a learning processor 130, a sensing unit 140, an output unit 150, a memory 170, and a processor 180.

The communication unit 110 may transmit and receive data to and from external devices such as an AI server 200 and other AI devices 100a to 100e based on wired or wireless communication technology. For example, the communication unit 110 may transmit and receive sensor information, user inputs, learning models, and control signals to and from the external devices.

The communication technology used by the communication unit 110 includes Global System for Mobile communication (GSM), Code Division Multiple Access (CDM), Long Term Evolution (LTE), 5G, Wireless Local Area Network (WLAN), Wireless Fidelity (Wi-Fi), Bluetooth™, Radio Frequency Identification (RFID), Infrared Data Association (IrDA), ZigBee, Near Field Communication (NFC), etc.

The input unit 120 may obtain various types of data.

The input unit 120 may include a camera for inputting a video signal, a microphone for receiving an audio signal, and a user input unit for receiving information from a user. The camera or microphone may be treated as a sensor, and the signal obtained from the camera or microphone may be considered as sensing data or sensor information.

The input unit 120 may obtain learning data for a learning model and input data to be used when an output is obtained based on the learning model. The input unit 120 may obtain raw input data. In this case, the processor 180 or learning processor 130 may extract an input feature by preprocessing the input data.

The learning processor 130 may train a model configured with an ANN based on the learning data. Here, the trained ANN may be referred to as the learning model. The learning model may be used to infer a result value for new input data rather than the learning data, and the inferred value may be used as a basis for determining whether to perform a certain operation.

In this case, the learning processor 130 may perform AI processing together with a learning processor 240 of the AI server 200.

The learning processor 130 may include a memory integrated with or implemented in the AI device 100. Alternatively, the learning processor 130 may be implemented with the memory 170, an external memory directly coupled to the AI device 100, or a memory in an external device.

The sensing unit 140 may obtain at least one of internal information of the AI device 100, surrounding environment information of the AI device 100, and user information using various sensors.

The sensor included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, a radar, and the like.

The output unit 150 may generate an output related to visual, audible, or tactile sense.

The output unit 150 may include a display unit for outputting visual information, a speaker for outputting audible information, a haptic module for outputting tactile information, and the like.

The memory 170 may store data supporting various functions of the AI device 100. For example, the memory 170 may store input data, learning data, learning models, learning histories, etc. obtained by the input unit 120.

The processor 180 may determine at least one executable operation of the AI device 100 based on information determined or generated by a data analysis algorithm or machine learning algorithm. The processor 180 may control the components of the AI device 100 to perform the determined operation.

To this end, the processor 180 may request, search for, receive, or employ data of the learning processor 130 or memory 170 and control the components of the AI device 100 to execute an expected or preferable operation or among the one or more executable operations.

If the processor 180 requires association with an external device to perform the determined operation, the processor 180 may generate a control signal for controlling the corresponding external device and transmit the generated control signal to the external device.

The processor 180 may obtain intention information from a user input and determine the intention of the user based on the obtained intention information.

In this case, the processor 180 may obtain the intention information corresponding to the user input using at least one of a speech-to-text (STT) engine for converting a voice input into a character string or a natural language processing (NLP) engine for obtaining intention information from a natural language.

At least one of the STT engine and the NLP engine may be configured with the ANN of which at least a part is trained according to the machine learning algorithm. At least one of the STT engine and the NLP engine may be trained by the learning processor 130, by the learning processor 240 of the AI server 200, or by distributed processing thereof.

The processor 180 may collect history information including user feedback on the operation of the AI device 100 and details thereof. The processor 180 may store the history information in the memory 170 or learning processor 130 or transmit the history information to an external device such as the AI server 200. The collected history information may be used to update the learning model.

The processor 180 may control at least some of the components of the AI device 100 to drive an application program stored in the memory 170. Further, the processor 180 may operate two or more of the components included in the AI device 100 in combination to drive the application program.

Figure 14:
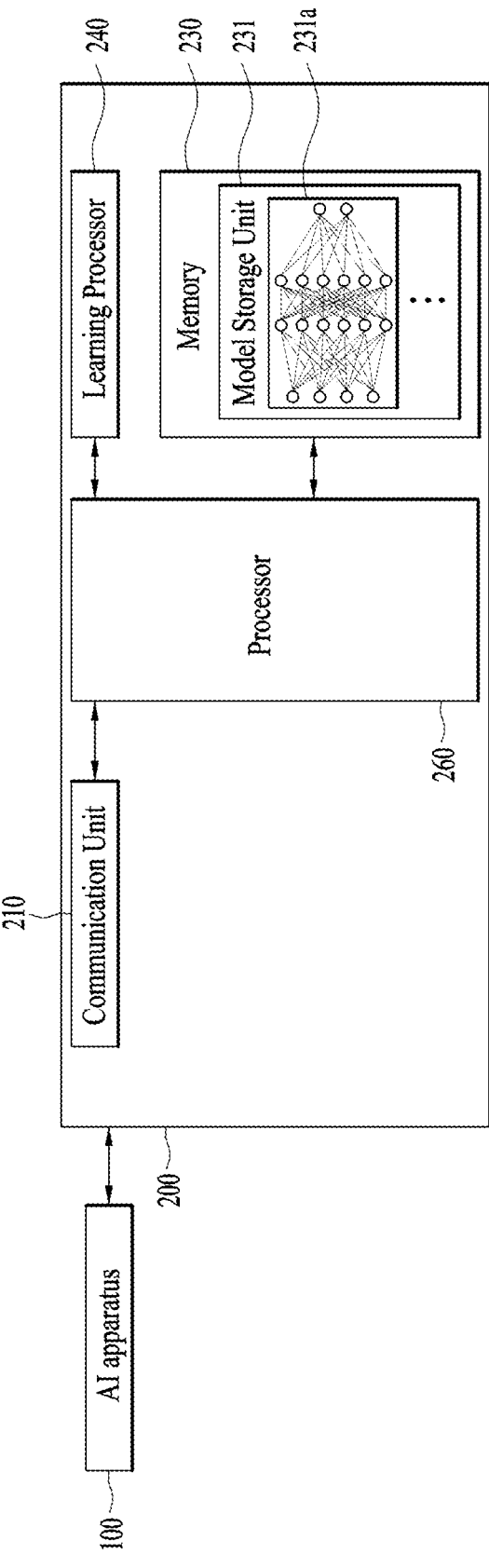

FIG. 14 illustrates the AI server 200 according to an embodiment of the present disclosure.

Referring to FIG. 14, the AI server 200 may mean a device for training an ANN based on a machine learning algorithm or a device for using a trained ANN. Here, the AI server 200 may include a plurality of servers to perform distributed processing or may be defined as a 5G network. The AI server 200 may be included as a part of the AI device 100 to perform at least part of AI processing together.

The AI server 200 may include a communication unit 210, a memory 230, the learning processor 240, a processor 260, and the like.

The communication unit 210 may transmit and receive data to and from an external device such as the AI device 100.

The memory 230 may include a model storage unit 231. The model storage unit 231 may store a model being trained or trained (or an ANN 231*a*) through the learning processor 240.

The learning processor 240 may train the ANN 231*a* based on learning data. The ANN, i.e., a learning model may be included in the AI server 200 or in an external device such as the AI device 100.

The learning model may be implemented by hardware, software or a combination thereof. If a part or the entirety of the learning model is implemented with software, one or more instructions for the learning model may be stored in the memory 230.

The processor 260 may infer a result value for new input data based on the learning model and generate a response or control command based on the inferred result value.

Figure 15:
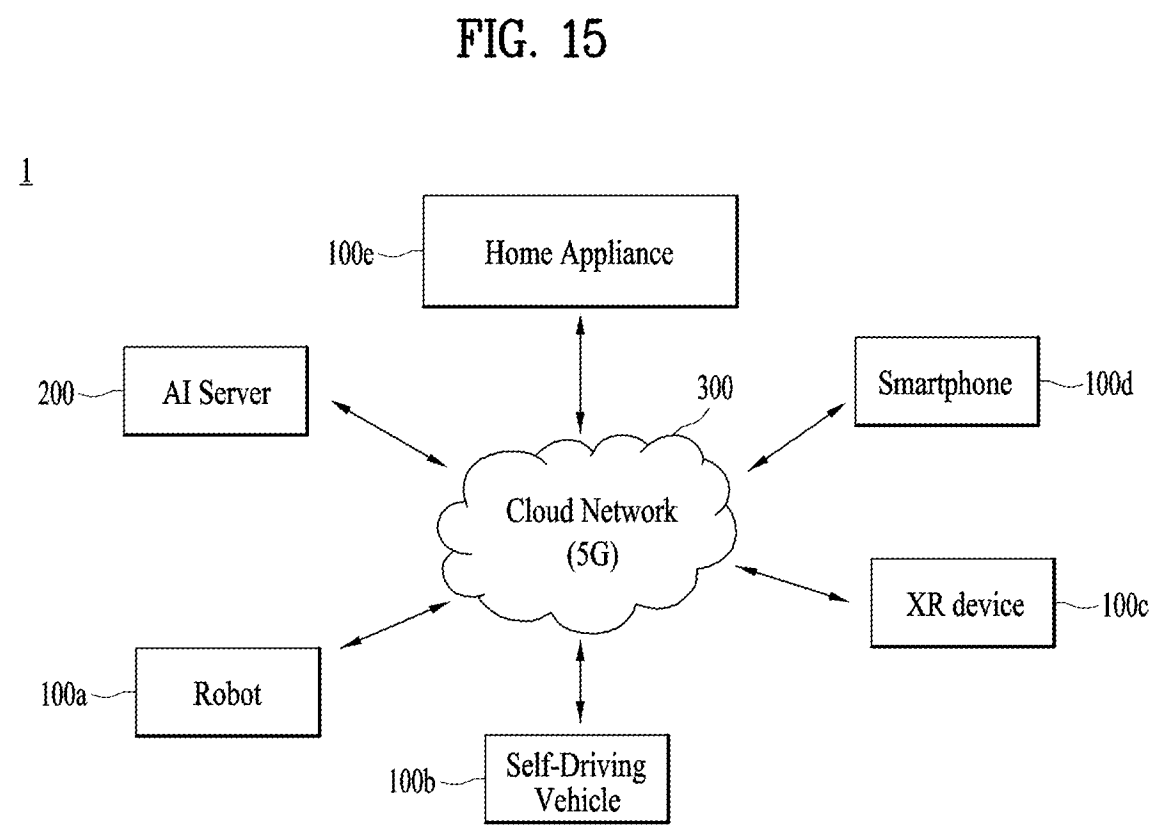

FIG. 15 illustrates an AI system 1 according to an embodiment of the present disclosure.

Referring to FIG. 15, at least one of the AI server 200, a robot 100*a*, an autonomous driving vehicle 100*b*, an XR device 100*c*, a smartphone 100*d*, and a home appliance 100*e* is connected to a cloud server 10 in the AI system 1. Here, the robot 100*a*, the autonomous vehicle 100*b*, the XR device 100*c*, the smartphone 100*d*, or the home appliance 100*e*, to which the AI technology is applied, may be referred to as an AI device 100*a* to 100*e*.

The cloud network 10 may refer to a network configuring part of a cloud computing infrastructure or a network existing in the cloud computing infrastructure. Here, the cloud network 10 may be configured with a 3G network, a 4G or LTE network, or a 5G network.

That is, each of the devices 100*a* to 100*e* and 200 included in the AI system 1 may be connected to each other through the cloud network 10. In particular, the devices 100*a* to 100*e* and 200 may communicate with each other through a BS or may communicate with each other directly without the BS.

The AI server 200 may include a server in charge of AI processing and a server in charge of big data computation.

The AI server 200 may be connected to at least one of the robot 100*a*, the autonomous vehicle 100*b*, the XR device 100*c*, the smartphone 100*d*, or the home appliance 100*e* included in the AI system 1 via the cloud network 10 and help at least part of AI processing of the connected AI devices 100*a* to 100*e*.

In this case, the AI server 200 may train an ANN according to a machine learning algorithm on behalf of the AI devices 100*a* to 100*e* and directly store or transmit a learning model to the AI devices 100*a* to 100*e*.

The AI server 200 may receive input data from the AI devices 100*a* to 100*e*, infer a result value for the received input data based on the learning model, generate a response or control command based on the inferred result value, and transmit the response or control command to the AI devices 100*a* to 100*e*.

Alternatively, the AI devices 100*a* to 100*e* may directly infer the result value for the input data based on the learning model and generate the response or control command based on the inferred result value.

Hereinafter, various embodiments of the AI devices 100*a* to 100*e* to which the above-described technology is applied will be described. The AI devices 100*a* to 100*e* illustrated in FIG. 15 may be considered as a specific example of the AI device 100 illustrated in FIG. 14.

<AI+Robot>

If the AI technology is applied to the robot 100*a*, the robot 100*a* may be implemented as a guide robot, a transport robot, a cleaning robot, a wearable robot, an entertainment robot, a pet robot, an unmanned flying robot, etc.

The robot 100*a* may include a robot control module for controlling an operation, and the robot control module may refer to a software module or a chip implemented by hardware.

The robot 100*a* may obtain state information of the robot 100*a*, detect (recognize) a surrounding environment and objects, generate map data, determine a travel route or driving plan, or determine a response or action to user interaction by using sensor information obtained from various types of sensors.

To determine the travel route or driving plan, the robot 100*a* may use sensor information obtained from at least one of the following sensors: a LIDAR, a radar, and a camera to determine a movement route and a travel plan.

The robot 100*a* may perform the above-described operations based on a learning model configured with at least one ANN. For example, the robot 100*a* may recognize the surrounding environment and objects based on the learning model and determine an operation based on the recognized surrounding environment or object. Here, the learning model may be directly trained by the robot 100*a* or by an external device such as the AI server 200.

The robot 100*a* may operate by directly generating a result based on the learning model. Alternatively, the robot 100*a* may transmit sensor information to the external device such as the AI server 200 and receive a result generated based on the sensor information.

The robot 100*a* may determine the travel route and driving plan based on at least one of the map data, the object information detected from the sensor information, or the object information obtained from the external device. Then, the robot 100*a* may move according to the determined travel path and driving plan under control of its driving unit.

The map data may include object identification information about various objects placed in a space in which the robot 100*a* moves. For example, the map data may include object identification information about fixed objects such as walls and doors and movable objects such as flower pots and desks. The object identification information may include a name, a type, a distance, a position, etc.

The robot 100*a* may operate and move by controlling the driving unit based on the user control/interaction. In this case, the robot 100*a* may obtain intention information from the motion or speech of the user and determine a response based on the obtained intention information.

<AI+Autonomous Driving>

If the AI technology is applied to the autonomous driving vehicle 100*b*, the autonomous driving vehicle 100*b* may be implemented as a mobile robot, a vehicle, an unmanned flying vehicle, etc.

The autonomous driving vehicle 100*b* may include an autonomous driving control module for controlling the autonomous driving function, and the autonomous driving control module may refer to a software module or a chip implemented by hardware. The autonomous driving control module may be included in the autonomous driving vehicle 100b as a component thereof, but it may be implemented with separate hardware and connected to the outside of the autonomous driving vehicle 100b.

The autonomous driving vehicle 100b may obtain state information about the autonomous driving vehicle 100b based on sensor information acquired from various types of sensors, detect (recognize) a surrounding environment and objects, generate map data, determine a travel route and driving plan, or determine an operation.

Similarly to the robot 100a, the autonomous driving vehicle 100b may use the sensor information obtained from at least one of the following sensors: a LIDAR, a radar, and a camera so as to determine the travel route and driving plan.

In particular, the autonomous driving vehicle 100b may recognize an environment and objects in an area hidden from view or an area over a certain distance by receiving the sensor information from external devices. Alternatively, the autonomous driving vehicle 100b may receive information, which is recognized by the external devices.

The autonomous driving vehicle 100b may perform the above-described operations based on a learning model configured with at least one ANN. For example, the autonomous driving vehicle 100b may recognize the surrounding environment and objects based on the learning model and determine the driving path based on the recognized surrounding environment and objects. The learning model may be trained by the autonomous driving vehicle 100a or an external device such as the AI server 200.

The autonomous driving vehicle 100b may operate by directly generating a result based on the learning model. Alternatively, the autonomous driving vehicle 100b may transmit sensor information to the external device such as the AI server 200 and receive a result generated based on the sensor information.

The autonomous driving vehicle 100b may determine the travel route and driving plan based on at least one of the map data, the object information detected from the sensor information, or the object information obtained from the external device. Then, the autonomous driving vehicle 100b may move according to the determined travel path and driving plan under control of its driving unit.

The map data may include object identification information about various objects placed in a space (e.g., road) in which the autonomous driving vehicle 100b moves. For example, the map data may include object identification information about fixed objects such as street lamps, rocks, and buildings and movable objects such as vehicles and pedestrians. The object identification information may include a name, a type, a distance, a position, etc.

The autonomous driving vehicle 100b may operate and move by controlling the driving unit based on the user control/interaction. In this case, the autonomous driving vehicle 100b may obtain intention information from the motion or speech of a user and determine a response based on the obtained intention information.

<AI+XR>

When the AI technology is applied to the XR device 100c, the XR device 100c may be implemented as a HMD, a HUD mounted in vehicles, a TV, a mobile phone, a smartphone, a computer, a wearable device, a home appliance, a digital signage, a vehicle, a fixed robot, a mobile robot, etc.

The XR device 100c may analyze three-dimensional point cloud data or image data obtained from various sensors or external devices, generate position data and attribute data for three-dimensional points, obtain information about a surrounding environment or information about a real object, perform rendering to on an XR object, and then output the XR object. For example, the XR device 100c may output an XR object including information about a recognized object, that is, by matching the XR object with the recognized object.

The XR device 100c may perform the above-described operations based on a learning model configured with at least one ANN. For example, the XR device 100c may recognize the real object from the three-dimensional point cloud data or image data based on the learning model and provide information corresponding to the recognized real object. The learning model may be directly trained by the XR device 100c or an external device such as the AI server 200.

The XR device 100c may operate by directly generating a result based on the learning model. Alternatively, the XR device 100c may transmit sensor information to the external device such as the AI server 200 and receive a result generated based on the sensor information.

<AI+Robot+Autonomous Driving>

When the AI technology and the autonomous driving technology are applied to the robot 100a, the robot 100a may be implemented as a guide robot, a transport robot, a cleaning robot, a wearable robot, an entertainment robot, a pet robot, an unmanned flying robot, etc.

The robot 100a to which the AI technology and the autonomous driving technology are applied may refer to the robot 100a with the autonomous driving function or the robot 100a interacting with the autonomous driving vehicle 100b.

The robot 100a having the autonomous driving function may be collectively referred to as a device that move along a given movement path without human control or a device that moves by autonomously determining its movement path.

The robot 100a having the autonomous driving function and the autonomous driving vehicle 100b may use a common sensing method to determine either a travel route or a driving plan. For example, the robot 100a having the autonomous driving function and the autonomous driving vehicle 100b may determine either the travel route or the driving plan based on information sensed through a LIDAR, a radar, and a camera.

The robot 100a interacting with the autonomous driving vehicle 100b may exist separately from with the autonomous driving vehicle 100b. That is, the robot 100a may perform operations associated with the autonomous driving function inside or outside the autonomous driving vehicle 100b or interwork with a user on the autonomous driving vehicle 100b.

The robot 100a interacting with the autonomous driving vehicle 100b may control or assist the autonomous driving function of the autonomous driving vehicle 100b by obtaining sensor information on behalf of the autonomous driving vehicle 100b and providing the sensor information to the autonomous driving vehicle 100b or by obtaining sensor information, generating environment information or object information, and providing the information to the autonomous driving vehicle 100b.

Alternatively, the robot 100a interacting with the autonomous driving vehicle 100b may monitor the user on the autonomous driving vehicle 100b or control the autonomous driving vehicle 100b through the interaction with the user. For example, when it is determined that the driver is in a drowsy state, the robot 100a may activate the autonomous driving function of the autonomous driving vehicle 100*b* or assist the control of the driving unit of the autonomous driving vehicle 100*b*. The function of the autonomous driving vehicle 100*b* controlled by the robot 100*a* may include not only the autonomous driving function but also functions installed in the navigation system or audio system provided in the autonomous driving vehicle 100*b*.

Alternatively, the robot 100*a* interacting with the autonomous driving vehicle 100*b* may provide information to the autonomous driving vehicle 100*b* outside the autonomous driving vehicle 100*b* or assist the autonomous driving vehicle 100*b* outside the autonomous driving vehicle 100*b*. For example, the robot 100*a* may provide traffic information including signal information such as smart traffic lights to the autonomous driving vehicle 100*b* or automatically connect an electric charger to a charging port by interacting with the autonomous driving vehicle 100*b* like an automatic electric charger installed in an electric vehicle.

<AI+Robot+XR>

When the AI technology and the XR technology are applied to the robot 100*a*, the robot 100*a* may be implemented as a guide robot, a transport robot, a cleaning robot, a wearable robot, an entertainment robot, a pet robot, an unmanned flying robot, a drone, etc.

The robot 100*a* to which the XR technology is applied may refer to a robot subjected to control/interaction in an XR image. In this case, the robot 100*a* may be separated from the XR device 100*c* but interact with the XR device 100*c*.

When the robot 100*a* subjected to control/interaction in the XR image obtains sensor information from sensors including a camera, the robot 100*a* or XR device 100*c* may generate the XR image based on the sensor information, and then the XR device 100*c* may output the generated XR image. The robot 100*a* may operate based on a control signal input through the XR device 100*c* or user interaction.

For example, a user may confirm the XR image corresponding to the perspective of the robot 100*a* remotely controlled through an external device such as the XR device 100*c*. Then, the user may adjust the autonomous driving path of the robot 100*a* or control the operation or movement of the robot 100*a* through interaction therewith or check information about surrounding objects.

<AI+Autonomous Driving+XR>

When the AI technology and the XR technology is applied to the autonomous driving vehicle 100*b*, the autonomous driving vehicle 100*b* may be implemented as a mobile robot, a vehicle, an unmanned flying vehicle, etc.

The autonomous driving vehicle 100*b* to which the XR technology is applied may refer to an autonomous driving vehicle capable of providing an XR image or an autonomous driving vehicle subjected to control/interaction in an XR image. In particular, the autonomous driving vehicle 100*b* subjected to control/interaction in the XR image may be separated from the XR device 100*c* but interact with the XR device 100*c*.

The autonomous driving vehicle 100*b* capable of providing the XR image may obtain sensor information from sensors including a camera and output the generated XR image based on the obtained sensor information. For example, the autonomous driving vehicle 100*b* may include an HUD for outputting an XR image, thereby providing a user with an XR object corresponding to an object in the screen together with a real object.

When the XR object is displayed on the HUD, at least part of the XR object may overlap with the real object which the user looks at. On the other hand, when the XR object is displayed on a display provided in the autonomous driving vehicle 100*b*, at least part of the XR object may overlap with the object in the screen. For example, the autonomous driving vehicle 100*b* may output XR objects corresponding to objects such as a lane, another vehicle, a traffic light, a traffic sign, a two-wheeled vehicle, a pedestrian, a building, etc.

When the autonomous driving vehicle 100*b* subjected to control/interaction in the XR image may obtain the sensor information from the sensors including the camera, the autonomous driving vehicle 100*b* or the XR device 100*c* may generate the XR image based on the sensor information, and then the XR device 100*c* may output the generated XR image. The autonomous driving vehicle 100*b* may operate based on a control signal input through an external device such as the XR device 100*c* or user interaction.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'mobile station (MS)', 'mobile subscriber station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method comprising:
   receiving, by an integrated access and backhaul (IAB) node from a serving cell, first information related to a timing offset;
   determining, by the IAB node, a time difference between a transmission time of a signal from the serving cell and a reception time of the signal by the IAB node based on second information related to a timing advance (TA) for the serving cell and the first information; and
   determining, by the IAB node, a downlink transmission time based on the time difference.

2. The method of claim 1, further comprising:
   transmitting a downlink signal to a child node based on the determined downlink transmission time.

3. The method of claim 1, wherein the first information is provided in a medium access control (MAC) control element (CE).

4. The method of claim 1, wherein the downlink transmission time is determined to be preceded from a reception timing as much as the time difference.

5. An integrated access and backhaul (IAB) node comprising:
   at least one processor; and
   at least one computer memory storing instructions that, when executed by the at least one processor, cause the IAB node to perform operations comprising:
   receiving first information related to a timing offset from a serving cell;
   determining a time difference between a transmission time of a signal from the serving cell and a reception time of the signal by the IAB node based on second information related to a timing advance (TA) for the serving cell and the first information; and determining a downlink transmission time based on the time difference.

6. The IAB node of claim 5, wherein the operations further comprise transmitting a downlink signal to a child node based on the determined downlink transmission time.

7. The IAB node of claim 5, wherein the first information is provided in a medium access control (MAC) control element (CE).

8. The IAB node of claim 5, wherein the downlink transmission time is determined to be preceded from a reception timing as much as the time difference.

9. An apparatus for an integrated access and backhaul (IAB) node in a wireless communication system, the apparatus comprising:
   at least one processor; and
   at least one computer memory storing instructions that, when executed by the at least one processor, cause the IAB node to perform operations comprising:
   receiving first information related to a timing offset from a serving cell;
   determining a time difference between a transmission time of a signal from the serving cell and a reception time of the signal by the IAB node based on second information related to a timing advance (TA) for the serving cell and the first information; and
   determining a downlink transmission time based on the time difference.

10. A non-transitory computer readable storage medium comprising program instructions that, when executed by at least one processor, cause an integrated access and backhaul (IAB) node to perform operations comprising:
   receiving first information related to a timing offset from a serving cell;
   determining a time difference between a transmission time of a signal from the serving cell and a reception time of the signal by the IAB node based on second information related to a timing advance (TA) for the serving cell and the first information; and
   determining a downlink transmission time based on the time difference.

* * * * *